US 8,886,658 B2

(12) United States Patent
Zheng et al.

(10) Patent No.: US 8,886,658 B2
(45) Date of Patent: Nov. 11, 2014

(54) METHOD AND DEVICE FOR DISPLAYING MESSAGE

(71) Applicant: Tencent Technology (Shenzhen) Company Limited, Shenzhen (CN)

(72) Inventors: Linzhou Zheng, Shenzhen (CN); Xungeng Li, Shenzhen (CN); Dan Liu, Shenzhen (CN); Yu Chen, Shenzhen (CN); Mao Wang, Shenzhen (CN); Rongde Yang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 13/862,016

(22) Filed: Apr. 12, 2013

(65) Prior Publication Data
US 2013/0226943 A1   Aug. 29, 2013

Related U.S. Application Data

(63) Continuation of application No. PCT/CN2011/078066, filed on Aug. 5, 2011.

(51) Int. Cl.
*G06F 17/30* (2006.01)
*H04L 12/58* (2006.01)

(52) U.S. Cl.
CPC .......... *G06F 17/30477* (2013.01); *H04L 51/22* (2013.01); *H04L 51/04* (2013.01)
USPC ................................. 707/755; 707/E17.041

(58) Field of Classification Search
CPC combination set(s) only.
See application file for complete search history.

(56) References Cited

U.S. PATENT DOCUMENTS

| 7,680,895 | B2 | 3/2010 | Perlow et al. |
| 2005/0193345 | A1 | 9/2005 | Klassen et al. |
| 2005/0288042 | A1 | 12/2005 | Lai et al. |
| 2007/0185961 | A1* | 8/2007 | Perlow et al. ............ 709/206 |

FOREIGN PATENT DOCUMENTS

| CN | 101047520 A | 10/2007 |
| CN | 101416207 A | 4/2009 |
| EP | 1924068 A1 | 5/2008 |
| JP | 2002163217 A | 6/2002 |
| JP | 2006505037 A | 2/2006 |
| KR | 1020100027853 A | 3/2010 |
| WO | 03030003 A1 | 4/2003 |
| WO | 2004040461 A1 | 5/2004 |

OTHER PUBLICATIONS

Written Opinion of the International Searching Authority (in Chinese with English translation) for International Application No. PCT/CN2011/078066, dated Nov. 10, 2011.

(Continued)

*Primary Examiner* — Anteneh Girma
(74) *Attorney, Agent, or Firm* — Harness, Dickey & Pierce, P.L.C.

(57) ABSTRACT

A method and device for displaying messages including receiving messages, querying and acquiring a user message memory database corresponding to a sender user number according to the sender user number carried in the messages; combining the received messages according to a preset time strategy and the acquired user message memory database; and displaying the combined message. The amount of new messages displayed in a message receiving interface list can be increased, user's chat experience can be improved, and display screen utilization rate can be improved.

10 Claims, 4 Drawing Sheets

(56) References Cited

OTHER PUBLICATIONS

International Search Report for International Patent Application No. PCT/CN2011/078066, dated Nov. 10, 2011, and English translation thereof.

Extended European Search Report for Application No. 11831998.7, dated Apr. 30, 2014.

Japanese Office Action for Application No. 2013-533075 dated Apr. 4, 2014, and its English translation thereof.

Korean Office Action for Application No. 10-2013-7010685 dated Apr. 9, 2014, and its English translation thereof.

* cited by examiner

METHOD AND DEVICE FOR DISPLAYING MESSAGE

CROSS-REFERENCE TO RELATED APPLICATIONS

This application is a continuation of International Patent Application No. PCT/CN2011/078066, filed Aug. 5, 2011. This application claims the benefit and priority of Chinese Patent Application No. 201010526219.7, filed Oct. 13, 2010. The entire disclosures of each of the above applications are incorporated herein by reference.

FIELD

The present disclosure relates to computer network technology and to a method and device for displaying message.

BACKGROUND

This section provides background information related to the present disclosure which is not necessarily prior art.

With rapid development of Internet techniques, Instant Messaging (IM) tools, which realize instant communication on the internet through the peer-to-peer technology, are widely used. The IM tools have been accepted by most network users and have taken an indispensable role in the user's work and life. For example, as more and more users use mobile terminals, the users have more and more requirements for using the IM tools in the mobile terminals to chat. According to data released by Apple, at present, the sale volume of Apple's mobile terminals such as IOS equipment has been accumulating up to 120 million. Many users use the mobile terminals to realize communication in daily life and work.

In the existing technology, when a mobile terminal receives one or more message, the messages are sequentially stored in a message receiving interface list in the form of list with an interval reserved between every two adjacent stored messages, and a user is reminded of new messages through prompt tone. The user can enter in the message receiving interface and click the message receiving interface list so that the mobile terminal displays the received message on a display screen of the mobile terminal. If the number of received messages exceed the screen where the message receiving interface is, then after one new message on the display screen has been read, the message which has been read is scrolled to outside of the screen where the message receiving interface is, and messages which have not been read are scrolled to the current message receiving interface list in the screen. After the user reads the messages on the display screen, the user returns to the message receiving interface. If there is still a message which has been not read, the user can click the message which has been not read in the message receiving interface list again, so that the mobile terminal displays the received message which has been not read on the display screen for the user to read, until the user exits the message receiving interface after the user has read all the received new messages.

It can be seen from the above, in the existing method for displaying method, taking the existing mobile terminal as an example, the number of bytes contained in a received message is usually less, particularly a mobile terminal applied to QQ, a message is usually a sentence and has limited information. If the user reads the received messages one by one according to the above method, the existing limited display screen cannot be effectively used, and the user needs to perform operations such as clicking, reading, returning for each message. Thus, the user's operations of reading the new messages are complicated, take a long time, and affect the user's chat experience. Further, since the size of the screen in the mobile terminal is limited and a storage space having a certain gap is needed between the messages stored in the message receiving interface list to distinguish different messages, the amount of new messages displayed per unit area of the message receiving interface list is less, and this also increases complexity of the user's operations.

SUMMARY

This section provides a general summary of the disclosure, and is not a comprehensive disclosure of its full scope or all of its features.

Various embodiments provide a method for displaying message, which can increase the amount of new messages displayed per unit area of a message receiving interface list, improve users' chat experience and improve the utilization rate of a display screen.

Various embodiments provide a device for displaying message, which can increase the amount of new messages displayed per unit area of a message receiving interface list, improve users' chat experience and improve the utilization rate of a display screen.

Various embodiments provide a method for displaying message which includes:

A. querying and acquiring a user message storage database corresponding to a sender user number according to the sender user number carried in received messages;

B. combining the received messages according to a preset time strategy and the acquired user message storage database; and C. displaying the combined message.

A device for displaying message includes a message storage module, a message combination module and a displaying module; wherein the message storage module is configured to query and acquire a user message storage database corresponding to a sender user number according to the sender user number carried in received messages, and send the user message storage database to the message combination module;

the message combination module is configured to combine the received messages according to a preset time strategy and the acquired user message storage database, and send the combined message to the displaying module; and the displaying module is configured to display the received messages.

In various embodiments messages are received, and a user message storage database corresponding to a sender user number is queried and acquired according to the sender user number carried in the messages. The received messages are combined according to a preset time strategy and the acquired user message storage database. A new message prompt information is sent to a user. When a display request input by the user is received, the combined message corresponding to the display request is displayed. In this way, since the messages sent by the same user are effectively combined, the amount of new messages displayed in a message receiving interface list can be increased. This also makes content of the messages clear in logic, reduces the time for operating and reading the messages, and improves users' chat experience. Further, after the combination of the messages, the displayed messages can cover the entire display screen, thereby improving the space utilization rate of the display screen.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

To make the objects, technical solution and advantages of the present invention more clear, example embodiments are hereinafter described in detail with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

In the existing technology, since a new message is displayed once the new message is received, the amount of new messages displayed per unit area of the message receiving interface list is less, and a user's operation of reading the new messages is complicated. For a new message having a small number of bytes, although the data size of the new message is far less than the data size that a displaying screen can display, each message still needs to occupy the entire display screen, resulting in a lower space utilization rate of the display screen.

Various embodiments, based on the above existing defects, provide a method for displaying message, which can make full use of the screen space and modify the existing message displaying mode by combining a plurality of received messages to increase the amount of messages displayed per unit area, save the display screen space, and improve utilization rate of the display screen, and thereby improve users' experience during chatting.

The following will take IM chatting in a mobile terminal as an example to illustrate various embodiments. Various embodiments are not limited to displaying messages in IM chatting in a mobile terminal, and can also be applied to displaying content on a display screen of a computer, and so on.

Figure 1:
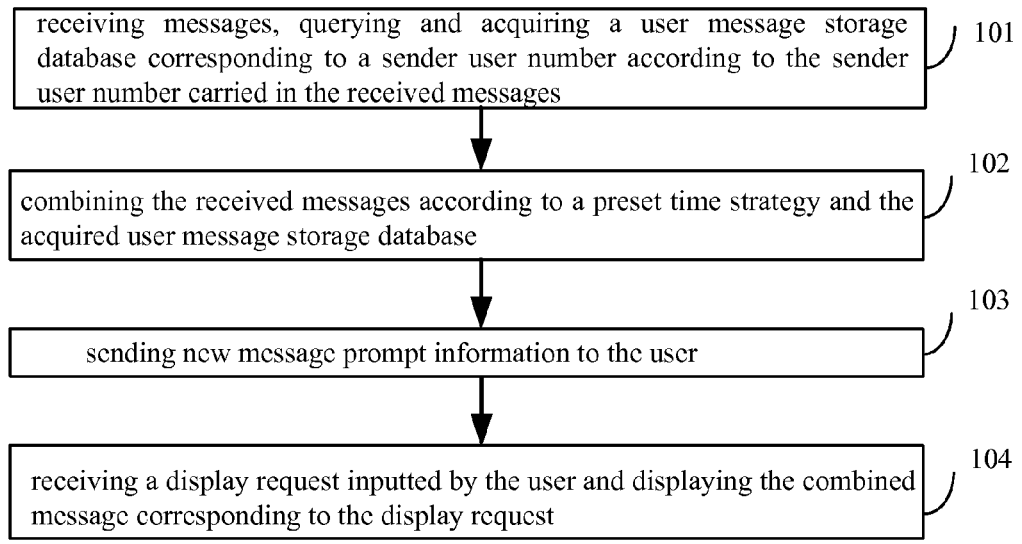
FIG. 1 is a flow chart of a method for displaying message of various embodiments.

FIG. 1 is a flow chart of a method for displaying message of various embodiments. Referring to FIG. 1, the flow includes:

Block 101: receiving messages, querying and acquiring a user message storage database corresponding to a sender user number according to the sender user number carried in the received messages. In this block, a mobile terminal receives messages, parses heads of the messages, acquires the sender user number carried in the received messages, and queries whether a user message storage database corresponding to the sender user number is set in the mobile terminal. If a user message storage database corresponding to the sender user number is set in the mobile terminal, then acquires the user message storage database corresponding to the sender user number. If a user message storage database corresponding to the sender user number is not set in the mobile terminal, then constructs a user message storage database corresponding to the sender user number.

In various embodiments, the user message storage database uses the structure of a dictionary, to store received user messages. The database can include an array, chain table and pointer, etc.

Figure 2:
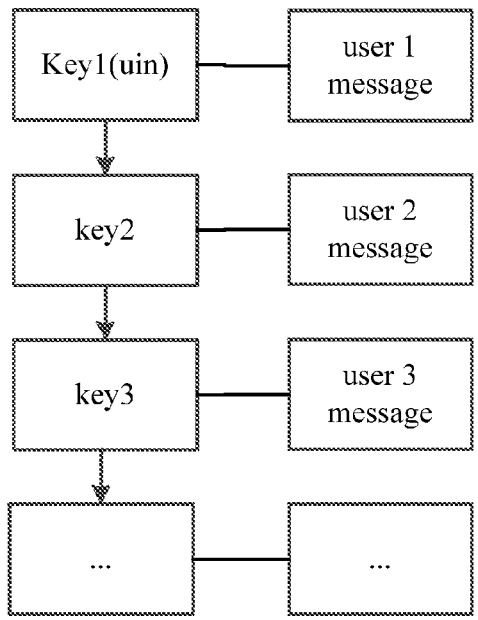
FIG. 2 is a schematic diagram of a dictionary of various embodiments.

FIG. 2 is a schematic diagram of a dictionary of various embodiments. Referring to FIG. 2, the dictionary includes a plurality of keywords and a plurality of user message storage databases corresponding to the keywords. Each keyword uses a sender user number as an identifier. After a mobile terminal receives a message forwarded by an external server, if a dictionary for a sender user contained in the message has not been constructed in a memory, then a dictionary is constructed in the memory to cache received messages through the dictionary structure. The dictionary uses a user number corresponding to the current chat object as a keyword and corresponds to one user message storage database.

The specific blocks of constructing a dictionary include:

parsing a header of a message to obtain a sender user number carried in the message; and determining whether there is a keyword which uses the sender user number as an identifier in a dictionary; if there is not a keyword which uses the sender user number as an identifier in the dictionary, then creating the keyword and a user message storage database corresponding to the keyword, and acquiring the user message storage database corresponding to the sender user number; if there is a keyword which takes the sender user number as an identifier in the dictionary, then directly acquiring the user message storage database corresponding to the sender user number.

Block 102: combining the received messages according to a preset time strategy and the acquired user message storage database. In this block, the combination of the received messages according to a preset time strategy and the acquired user message storage database specifically includes two concrete implementations.

Figure 3:
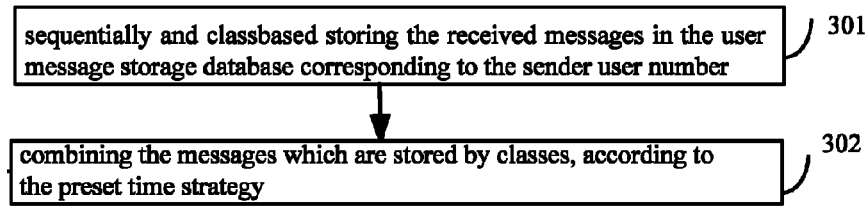
FIG. 3 is a flow chart of a first concrete implementation of various embodiments.

FIG. 3 is a flow chart of a first concrete implementation of various embodiments. Referring to FIG. 3, the flow includes:

Block 301: sequentially and classbased storing the received messages in the user message storage database corresponding to the sender user number. In this block, for the situation that a user message storage database corresponding to the sender user number is set in the mobile terminal, the received messages are sequentially and classbased stored in the user message storage database corresponding to the sender user number according to message sending time information or message receiving time information. For example, a sender user number contained in the received messages is user 1 and a user message storage database A corresponding to the user 1 is set in the mobile terminal. When the user message storage database A has sequentially stored three messages, then the currently received message is stored in the user message storage database A behind the third message. For the situation that a user message storage database corresponding to the sender user number is not set in the mobile terminal, the received message is directly stored in the constructed user message storage database.

Block 302: combining the messages which are stored by classes, according to the preset time strategy. In this block, each user number corresponds to a user message storage database, hereinafter referred to as database. The database is extracted to obtain time information (i.e., time stamp) of the ith and (i+1)th messages which are stored in sequence, where, i is a natural number, the maximum value of (i+1) is a preset maximum number of messages that can be stored in the database. After the database is full, the database can be updated through a first-in first-out (FIFO) strategy. If a difference between the time information of the ith message and the corresponding time information of the (i+1)th message is within the preset time strategy, then the (i+1)th message is combined into the ith message, and the time information of the ith message is taken as a time information of the new combined message. If the difference between the time information of the ith message and the corresponding time information of the (i+1)th message is beyond the preset time strategy, then no processing is made.

In various embodiments, the time information can be a message sending time or a message receiving time.

The preset time strategy can be set according to the practical needs. For example, for users who have high requirement of real time, the preset time strategy can be about 2 minutes. For users who have general requirement of real time, the preset time strategy can be about 5 minutes. For example, it is assumed that the preset time strategy is 5 minutes, extracting the user message storage database A, comparing the sending time of the ith message A[i] and the sending time of the message A[i+1]: if a difference between the two is less than or equal to 5 minutes, combining the two messages into one message for storage, a sending time of the combined message being the sending time of the ith message A[i]. If the difference between the two is more than 5 minutes, making no processing, and taking the message A[i+1] as the current message. Continuing to traverse the database, for the combined messages, continuing to compare a sending time of the next message and the sending time of the combined message: if a difference between the two is still less than or equal to 5 minutes, continuing to combine the two, if the difference between the two is more than 5 minutes, making no processing, until traversing all messages in the database. For the message with no processing, continuing to compare a sending time of the next message and the sending time of the current message. If a time interval between the two is less than 5 minutes, combining the two, if the time interval between the two is more than 5 minutes, making no processing, until traversing all messages in the database.

Figure 4:
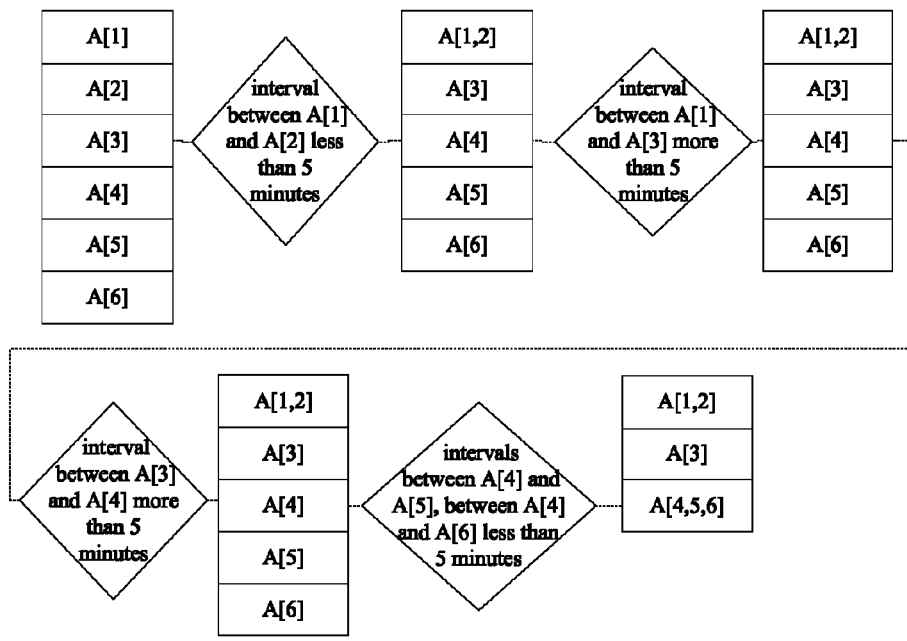
FIG. 4 is a logical structure schematic diagram of combining messages of various embodiments.
Figure 5:
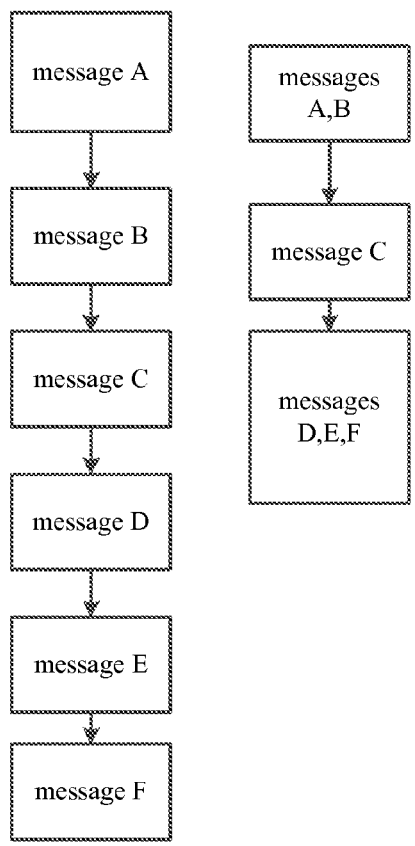
FIG. 5 is a schematic diagram showing messages stored in a user message storage database after the performance of message combination based on FIG. 4 according to various embodiments.

FIG. 4 is a logical structure schematic diagram of combining messages of various embodiments. Referring to FIG. 4, it is assumed that the user message storage database A has sequentially stored six messages, which are A[1]-A[6], respectively. Comparing a sending time of the A[1] and a sending time of the A[2]: if a time interval (time difference) between the sending times of the two is less than 5 minutes, then combining the A[1] and A[2] to form a combined message being A[1,2] of which a sending time is the sending time of the original A[1], and deleting the A[2] from the user message storage database A. Then, acquiring a sending time of the A[3], if a time interval between the sending time of the A[3] and the sending time of the combined message A[1, 2] is more than 5 minutes, then retaining the A[3] and taking the A[3] as a message for the next combination. Next, comparing a time interval between a sending time of the A[4] and the sending time of the A[3], if the result is more than 5 minutes, then retaining the A[4]. Afterwards, comparing a time interval between a sending time of the A[5] and the sending time of the A[4], if the result is less than 5 minutes, then combining the A[5] and the A[4] to form a message A[4, 5] of which a sending time is the sending time of the original A[4], and deleting the A[5] from the user message storage database A. Finally, comparing a time interval between a sending time of the A[6] and the sending time of the combined message A[4, 5], if the result is less than 5 minutes, then combining the A[6] and the A[4, 5] to form a message A[4, 5, 6] of which a sending time is the sending time of the originally combined A[4, 5], and deleting the A[6] from the user message storage database A FIG. 5 is a schematic diagram showing messages stored in a user message storage database after the performance of message combination based on FIG. 4 according to various embodiments. Referring to FIG. 4, after combination, the number of messages contained in the user message database is reduced from the original six to three according to various embodiments. It is assumed that the message receiving interface list can display three messages, since the displayed three messages according to various embodiments contain content of the received six messages. Thus, the amount of new messages displayed per unit area of the message receiving interface list can be increased.

In the above example, the combination of two messages belongs to the existing technology, and details can refer to related technical literature and will not be repeated here.

Figure 6:
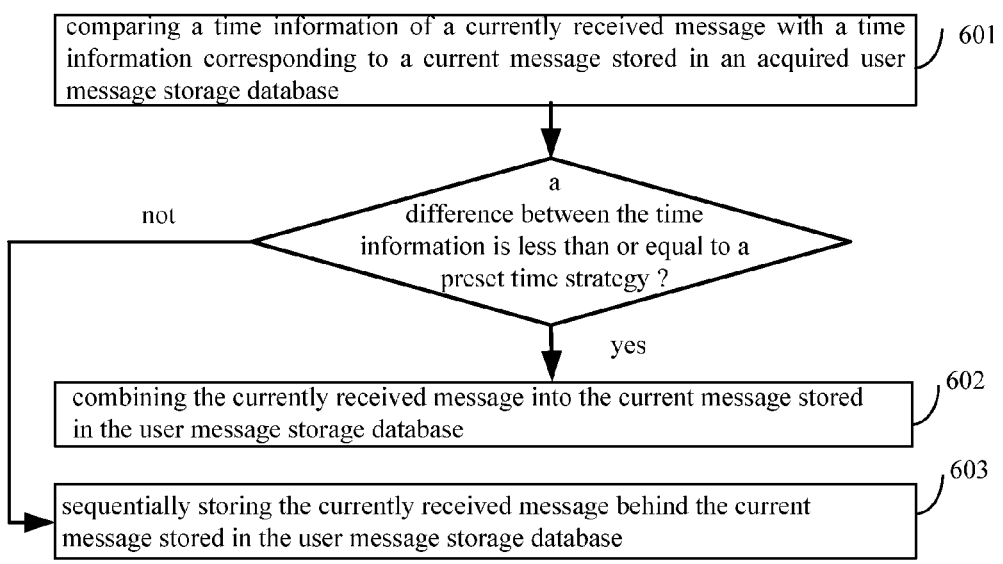
FIG. 6 is a flow chart of a second concrete implementation of various embodiments.

FIG. 6 is a flow chart of a second concrete implementation of various embodiments. FIG. 6 differs from that shown in FIG. 3, i.e., first storing the received messages and then combining the messages, in various embodiments, is to combine in real time the received messages and then store the messages, and the flow includes the following.

Block 601: comparing a time information of a currently received message with a time information corresponding to a current message stored in an acquired user message storage database, if a difference between the time information is less than or equal to a preset time strategy, performs block 602; otherwise, performs block 603. In this block, after receiving the new message, acquires the time information of the currently received message through parsing the message header, queries and acquires a user message storage database A corresponding to a user number according to the user number of the sender contained in the message, compares the time information of the currently received message A[i] with the time information of the current message A[i−1] stored in the user message storage database A.

In various embodiments, the time information is a sending time of the message.

Block 602: combining the currently received message into the current message stored in the user message storage database. In this block, if a difference between a sending time of the currently received message A[i] and a sending time of the current message A[i−1] stored in the user message storage database A is less than or equal to 5 minutes, then the two messages are combined into one message for storage. The current message stored in the user message storage database is still the message A[i−1] but the message A[i−1] contains the currently received message A[i], and the sending time of the current message stored in the user message storage database is still the sending time of the current message A[i−1] of the original user message storage database. Only the content of the received message is combined, i.e., A[i−1]=A[i−1]+A[i].

Block 603: sequentially storing the currently received message behind the current message stored in the user message storage database. In this block, if a difference between a sending time of the currently received message A[i] and a sending time of the current message A[i−1] stored in the user message storage database A is more than 5 minutes, then separately stores the currently received message A[i] and sequentially stores the currently received message A[i] behind the message A[i−1]. The current message stored in the user message storage database A is the message A[i].

In practical application, if the difference between the sending time of the currently received message and the sending time of the current message stored in the user message storage database is beyond the preset time strategy, a combined identifier can be set in the current message stored in the user message storage database, to indicate that this message does not need further processing. Subsequently, querying and acquiring a message does not carry a combined identifier, and starts to perform the combination process from this message, thereby simplifying the processing procedure.

In practical application, the received messages corresponding to the same sender user number can also be combined according to number of message bytes that a display screen can accommodate, so that the number of message bytes of the combined message is equal to or slightly less than the number of message bytes that the display screen can accommodate. In this way, the utilization rate of the display screen can be effectively improved.

In block 103: sending new message prompt information to the user. In this block, after the combination of the messages which are stored by classes according to the preset time strategy, the new message prompt information is sent to the user to remind the user of a received new message.

Block 104: receiving a display request input by the user and displaying the combined message corresponding to the display request. In this block, when the new message prompt information is received and the user is determined to read the new message, the user can click or touch a position where the new message prompt information is located to trigger inputting a corresponding display request, and the displaying screen will display the combined message corresponding to the display request.

In practical application, the combined message can be directly displayed after the performance of the block 102.

Figure 7:
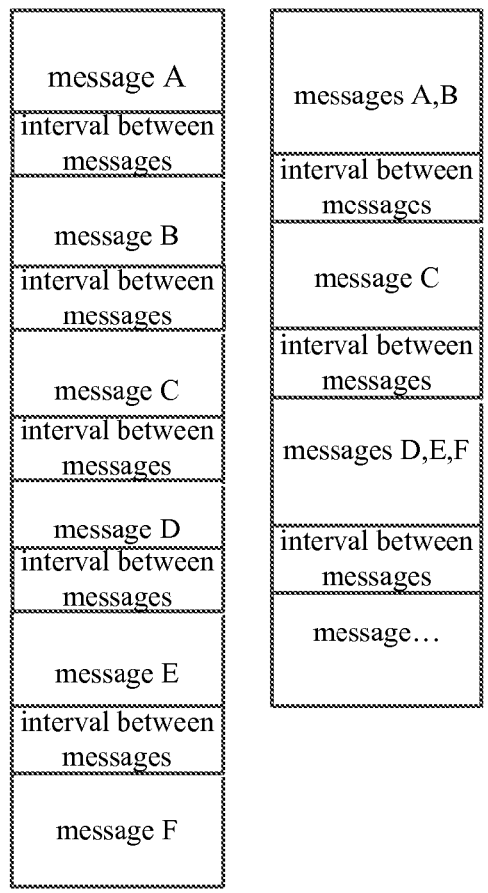
FIG. 7 is a schematic diagram showing a displaying effect of messages which are combined based on FIG. 4 according to various embodiments and a displaying effect of messages which are not combined in the existing technology.

FIG. 7 is a schematic diagram showing a displaying effect of messages which are combined based on FIG. 4 according to various embodiments and a displaying effect of messages which are not combined in the existing technology. Referring to FIG. 7, the left part shows a displaying effect of messages which are not combined in the existing technology, and the right part shows a displaying effect of messages which are combined based on FIG. 4 according to various embodiments. If only six messages can be displayed on a displaying screen in the existing technology, then more than six messages can be displayed on a displaying screen in various embodiments.

In the method for displaying message according to various embodiments, messages are received, and a user message storage database corresponding to a sender user number is queried and acquired according to the sender user number carried in the messages. The received messages are combined according to a preset time strategy and the acquired user message storage database. A new message prompt information is sent to a user. When a display request input by the user is received, the combined message corresponding to the display request is displayed. Since the messages sent by the same user are effectively combined, the amount of new messages displayed in a message receiving interface list can be increased, and reduce the user's operation number of received each new message. The user's operation of reading the messages are simple. Meanwhile, the combination of the messages can effectively reduce blank area left between messages, and make content of the messages clear in logic. Messages sent by the same user in a short time can be regarded as a segment of coherent content, thereby reducing the time for operating and reading the messages and improving users' chat experience. Further, after the combination of the messages, the displayed messages can cover the entire display screen, thereby improving the space utilization rate of the display screen and reducing the user's frequent operation of turning pages.

Figure 8:
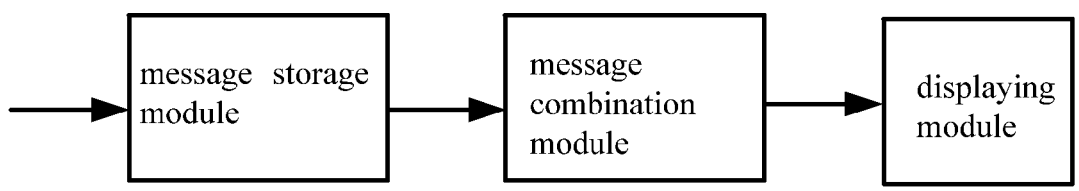
FIG. 8 is a schematic diagram of a device for displaying message of various embodiments.

FIG. 8 is a schematic diagram of a device for displaying message of various embodiments. Referring to FIG. 8, the device includes a message storage module, a message combination module and a displaying module.

The message storage module is configured to receive messages, query and acquire a user message storage database corresponding to a sender user number according to the sender user number carried in received messages, and send the user message storage database to the message combination module.

The message combination module is configured to combine the received messages according to a preset time strategy and the acquired user message storage database, send new message prompt information to a user, receive a display request input by the user, and send the combined message corresponding to the display request to the displaying module.

The displaying module is configured to display the received messages.

In various embodiments, the message storage module includes a message receiving unit, a message parsing unit, a message processing unit and a message storage unit (now shown).

The message receiving unit receives a message and sends the received message to the message parsing unit.

The message parsing unit parses the received message to obtain a sender user number carried in the message and sends the sender user number carried in the message to the message processing unit.

The message processing unit receives the sender user number, and queries whether a user message storage database corresponding to the sender user number is set in the message storage unit. If a user message storage database corresponding to the sender user number is set in the message storage unit, the received messages are sequentially and classbased stored in the user message storage database corresponding to the sender user number. If a user message storage database corresponding to the sender user number is not set in the message storage unit, a user message storage database corresponding to the sender user number is constructed in the message storage unit and stores the message.

The message combination module includes a time information obtaining unit, a determination unit, a message combination processing unit, a prompt information processing unit and a display message storage unit (not shown in the figures).

The time information obtaining unit reads the user message storage database from the message storage unit, obtains time information of the ith message and (i+1)th message which are sequentially stored, and sends the time information of the ith message and (i+1)th message which are sequentially stored to the determination unit.

The determination unit determines whether a difference between the input time information is within a preset time strategy. If the difference between the input time information is within the preset time strategy, sends the ith message and (i+1)th message to the message combination processing unit. Otherwise, sends the ith message and (i+1)th message to the display message storage unit and sends trigger information to the prompt information processing unit.

The message combination processing unit combines the received ith message and (i+1)th message, and sends the combined message to the display message storage unit and sends trigger information to the prompt information processing unit.

The prompt information processing unit receives the trigger information, outputs the new message prompt information to the user, receives a display request input by the user and sends the display request input by the user to the display message storage unit.

The display message storage unit receives the display request and sends the stored messages corresponding to the display request to the display module.

In practical application, the message storage module can also include a message receiving unit, a message parsing unit, a message processing unit and a message storage unit (now shown).

The message receiving unit receives a message and sends the received message to the message parsing unit and the message combination module, respectively.

The message parsing unit parses the received message to obtain a sender user number carried in the message and sends the sender user number carried in the message to the message processing unit.

The message processing unit receives the sender user number, and queries whether a user message storage database corresponding to the sender user number is set in the message storage unit. If a user message storage database corresponding to the sender user number is set in the message storage unit, sends a current message stored in the user message storage database to the message combination module. If a user message storage database corresponding to the sender user number is not set in the message storage unit, constructs a user message storage database corresponding to the sender user number in the message storage unit and stores the message.

The message combination module includes a time information obtaining unit, a determination unit, a message combination processing unit, a prompt information processing unit and a display message storage unit (not shown in the figures).

The time information obtaining unit receives the message, obtains time information of the message and sends the time information to the determination unit.

The determination unit determines whether a difference between the input time information is within a preset time strategy. If the difference between the input time information is within the preset time strategy, sends the message from the message receiving unit and the current message stored in the user message storage database of the message processing unit to the message combination processing unit. Otherwise, sends the message from the message receiving unit and the current message stored in the user message storage database of the message processing unit to the message storage unit, and sends trigger information to the prompt information processing unit.

The message combination processing unit combines the message from the message receiving unit into the current message stored in the user message storage database, uses the combined message to update the current message stored in the user message storage database, and sends trigger information to the prompt information processing unit.

The prompt information processing unit receives the trigger information, outputs the new message prompt information to the user, receives a display request input by the user and sends the display request input by the user to the display message storage unit.

The message storage unit receives the display request and sends the stored messages corresponding to the display request to the display module.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for displaying messages implemented by a mobile terminal having a display screen and at least one processor, comprising:
   A. querying and acquiring by the processor a user message storage database corresponding to a sender user number according to the sender user number carried in received messages;
   B. combining by the processor the received messages according to a preset time strategy and the acquired user message storage database;
   C. displaying the combined message on the display screen;
   wherein the block A specifically includes:
   receiving the messages, parsing heads of the messages, acquiring the sender user number carried in the messages, querying whether a user message storage database corresponding to the sender user number is set in the mobile terminal; if a user message storage database corresponding to the sender user number is set in the mobile terminal, acquiring the user message storage database corresponding to the sender user number; if a user message storage database corresponding to the sender user number is not set in the mobile terminal, constructing a user message storage database corresponding to the sender user number;
   wherein the block B specifically includes:
   sequentially and class based storing the received messages in the user message storage database corresponding to the sender user number;
   combining the messages which are stored by classes, according to the preset time strategy;
   wherein the combining the messages which are stored by classes specifically includes:

extracting the user message storage database to obtain time information of the ith message and the (i+1)th message which are stored in sequence, wherein i is a natural number and a maximum value of (i+1) is a maximum number of messages are stored in the user message storage database;

if a difference between the time information of the ith message and the corresponding time information of the (i+1)th message is within the preset time strategy, combining the (i+1)th message into the ith message, and taking the time information of the ith message as a time information of the new combined message; and if the difference between the time information of the ith message and the time information of the (i+1)th message is beyond the preset time strategy, making no processing.

2. The method according to claim 1, wherein the time information includes a message sending time or a message receiving time.

3. The method according to claim 1, wherein the displaying the combined message specifically includes:

sending new message prompt information to a user; and receiving a display request input by the user and displaying the combined message corresponding to the display request.

4. The method according to claim 3, wherein the user message storage database includes array, chain table and pointer.

5. A method for displaying messages implemented by a mobile terminal having a display screen and at least one processor, comprising:

A. querying and acquiring by the processor a user message storage database corresponding to a sender user number according to the sender user number carried in received messages;

B. combining by the processor the received messages according to a preset time strategy and the acquired user message storage database;

C. displaying the combined message on the display screen; wherein the block A specifically includes:

receiving the messages, parsing heads of the messages, acquiring the sender user number carried in the messages, querying whether a user message storage database corresponding to the sender user number is set in the mobile terminal; if a user message storage database corresponding to the sender user number is set in the mobile terminal, acquiring the user message storage database corresponding to the sender user number; if a user message storage database corresponding to the sender user number is not set in the mobile terminal, constructing a user message storage database corresponding to the sender user number;

wherein the block B specifically includes:

B1. comparing a time information of a currently received message with a time information corresponding to a current message stored in the user message storage database according to the acquired sender user number, if a difference between the time information of the two is less than or equal to the preset time strategy, performing block B2; otherwise, performing block B3;

B2. combining the currently received message into the current message which are stored by classes in the user message storage database; and B3. sequentially and class based storing the currently received message behind the current message stored in the user message storage database corresponding to the sender user number;

wherein the combining the messages which are stored by classes specifically includes:

extracting the user message storage database to obtain time information of the ith message and the (i+1)th message which are stored in sequence, wherein i is a natural number and a maximum value of (i+1) is a maximum number of messages are stored in the user message storage database;

if a difference between the time information of the ith message and the corresponding time information of the (i+1)th message is within the preset time strategy, combining the (i+1)th message into the ith message, and taking the time information of the ith message as a time information of the new combined message; and if the difference between the time information of the ith message and the time information of the (i+1)th message is beyond the preset time strategy, making no processing.

6. The method according to claim 5, further comprising:

setting a combined identifier in the current message stored in the user message storage database, wherein the combined identifier is configured to indicate that this message does not need further processing.

7. The method according to claim 5, wherein the time information includes a message sending time or a message receiving time.

8. The method according to claim 6, wherein the displaying the combined message specifically includes:

sending new message prompt information to a user; and receiving a display request input by the user and displaying the combined message corresponding to the display request.

9. The method according to claim 8, wherein the user message storage database includes array, chain table and pointer.

10. A device for displaying messages comprising a display screen and a processor coupled to a memory storing instructions, for executing by the processor, configured to:

query and acquire a user message storage database corresponding to a sender user number according to the sender user number carried in received messages;

combine the received messages according to a preset time strategy and the acquired user message storage database;

display the received messages on the display screen;

wherein the processor is further configured to receive the messages;

parse the received messages to obtain the sender user number carried in the messages and;

query whether a user message storage database corresponding to the sender user number is set in the device for displaying messages; if a user message storage database corresponding to the sender user number is set in the device for displaying messages sequentially and class based store the received messages in the user message storage database corresponding to the sender user number; if a user message storage database corresponding to the sender user number is not set in the device for displaying messages, construct a user message storage database corresponding to the sender user number in the device for displaying messages and storing the messages;

wherein the processor is further configured to read the user message storage database, obtain time information of the ith message and (i+1)th message which are sequentially stored wherein i is a natural number and a maximum value of (i+1) is a maximum number of messages stored in the user message storage database;

the processor is further configured to determine whether a difference between the input time information is within the preset time strategy; if the difference between the input time information is within the preset time strategy, combine the received ith message and (i+1)th message;

wherein the processor is further configured to output new message prompt information to a user, receive a display request input by the user and display the stored messages corresponding to the display request on the display screen.

\* \* \* \* \*